United States Patent
D'Amore et al.

(10) Patent No.: US 8,238,911 B2
(45) Date of Patent: Aug. 7, 2012

(54) APPARATUS AND METHODS OF CONFIGURABLE SYSTEM EVENT AND RESOURCE ARBITRATION MANAGEMENT

(75) Inventors: Tianyu Li D'Amore, San Diego, CA (US); Uppinder Singh Babbar, San Diego, CA (US); David C. Park, San Marcos, CA (US); Srinivasan Balasubramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 962 days.

(21) Appl. No.: 12/127,055

(22) Filed: May 27, 2008

(65) Prior Publication Data

US 2009/0119773 A1 May 7, 2009

(51) Int. Cl.
*H04M 7/20* (2006.01)
(52) U.S. Cl. ............ 455/435.3; 710/240; 710/241; 710/242; 710/243; 710/104.1
(58) Field of Classification Search ............ 455/453.3; 707/104.1
See application file for complete search history.

(56) References Cited

U.S. PATENT DOCUMENTS

| | | | | |
|---|---|---|---|---|
| 2002/0019880 A1* | 2/2002 | Sakakura | ............ | 709/245 |
| 2002/0058504 A1* | 5/2002 | Stanforth | ............ | 455/426 |
| 2002/0098840 A1* | 7/2002 | Hanson et al. | ............ | 455/435 |
| 2004/0209643 A1* | 10/2004 | Welsh | ............ | 455/556.1 |
| 2005/0097560 A1* | 5/2005 | Rolia et al. | ............ | 718/104 |
| 2005/0193155 A1* | 9/2005 | Fujita | ............ | 710/111 |
| 2007/0061557 A1* | 3/2007 | Shauh et al. | ............ | 713/1 |
| 2007/0118558 A1* | 5/2007 | Kahandaliyanage | ............ | 707/104.1 |

FOREIGN PATENT DOCUMENTS

| | | | |
|---|---|---|---|
| EP | 1422622 A2 | * | 5/2004 |
| KR | 20040042893 A | | 5/2004 |
| WO | WO 2004027603 A2 | * | 4/2004 |
| WO | WO 2006119471 A2 | * | 11/2006 |
| WO | WO2008042813 | | 4/2008 |

OTHER PUBLICATIONS

International Search Report and Written Opinion, PCT/US2007/083467—International Search Authority—European Patent Office, Oct. 6, 2008.

* cited by examiner

*Primary Examiner* — Charles Shedrick
(74) *Attorney, Agent, or Firm* — James T. Hagler

(57) ABSTRACT

Methods, apparatus, and computer-readable media for management and arbitration of dedicated mobile communication resources for mobile applications are provided. Mobile applications can be given a priority level that establishes an importance with respect to one or more other mobile applications and at least one mobile resource. If competing applications attempt to access the mobile resource concurrently, access can be provided to an application having higher priority level. Furthermore, control of a resource can be taken away from an application having lower priority in order to affect control of such resource for a higher priority application. In one aspect, a privilege code of an application can be verified prior to establishing control of the resource for the application, to mitigate a likelihood of inappropriate transfer of resources. Accordingly, the subject disclosure provides for management of dedicated resources for a mobile processing environment to effect important device functions with minimum delay.

23 Claims, 10 Drawing Sheets

APPARATUS AND METHODS OF CONFIGURABLE SYSTEM EVENT AND RESOURCE ARBITRATION MANAGEMENT

RELATED APPLICATIONS

The present application claims the benefit of priority to P.C.T. Patent Application No. PCT/US2007/083467 filed Nov. 2, 2007, the entire contents of which are hereby incorporated by reference.

FIELD

The following description relates generally to wireless communications, and more particularly to managing mobile application access to mobile communication resources.

BACKGROUND

In recent years, a variety of advancements has occurred in cellular communication technology and cellular communication devices. Some of the advancements, such as integration of camera and video recording technology onto such devices, incorporation of e-mail and short messaging services into mobile communication, and the like, involve software and/or hardware applications. These applications have added increased flexibility, processing power, communication capabilities, and so forth, to already popular communication devices (e.g., cellular telephones). As a result, such devices have become more popular in a consumer marketplace, motivating larger numbers of consumers to purchase such devices, or to upgrade to devices that include new applications and technologies.

Although applications have increased in number and complexity, support for such applications does not always increase commensurately. For instance, a variety of mobile application providers exist, constantly raising the bar with respect to complex and feature rich mobile applications. However, the nature of mobile device communication and network support for such communication cannot always advance as rapidly as the applications they support. For instance, although a mobile device can support multiple data transfer applications concurrently (e.g., e-mail, Internet browsers, voice over Internet protocol communication, and so on), network resources cannot always accommodate execution of concurrent applications. For example, only a single radio bearer typically is provided to a mobile communication device by a mobile base station subsystem (BSS). As a result, though certain exceptions exist, such as three-way calling or call waiting, typically only a single voice call can be conducted at one time. Accordingly, mobile device applications may not be fully leveraged by the devices and/or network components that support such applications.

SUMMARY

The following presents a simplified summary of one or more aspects in order to provide a basic understanding of such aspects. The subject summary is not an extensive overview of all contemplated aspects, and is intended to neither identify key or critical elements of all aspects nor delineate the scope of any or all aspects. Its sole purpose is to present some concepts of one or more embodiments in a simplified form as a prelude to the more detailed description that is presented later.

Management and arbitration of dedicated mobile communication resources for mobile applications is described herein. In one example, mobile applications can be given a priority level that establishes an importance with respect to one or more mobile resources. If competing applications attempt to access a dedicated resource concurrently, such as a packet data protocol (PDP) context or digital signal process (DSP) voice decoder, access can be provided to an application having higher priority level. Furthermore, in one implementation, control of a resource can be taken away from an application having lower priority in order to affect control of such resource for a higher priority application. According to one aspect, a privilege code of an application is verified prior to establishing control of the resource for the application, to mitigate a likelihood of inappropriate transfer of resources. Accordingly, the subject disclosure provides for management of dedicated resources for a mobile processing environment to affect important device functions with minimum delay.

According to one aspect, a method of providing system resource allocation for mobile device applications is provided. The method can include associating a first privilege code or a first priority level with a first mobile application of a mobile device and associating a second privilege code or a second priority level with a second mobile application of the mobile device. In addition, the method can include allowing or denying access to a mobile device resource for the first mobile application based at least in part on whether the first priority level is higher than the second priority level, if the first mobile application and the second mobile application attempt to access the resource concurrently.

According to a further aspect, an apparatus is disclosed that manages system resource allocation for mobile communication device applications. The apparatus can include a policy database that associates a privilege code, a priority level, or the privilege code and the priority level with a mobile application of a mobile device. Additionally, the apparatus can include a policy management module that approves or denies access to a system resource for the mobile application based at least on the priority level or the privilege code.

In accordance with another aspect, provided is at least one processor configured to manage allocation of system resources for mobile device applications. The processor can include a first module for associating a privilege code, a priority level, or the privilege code and the priority level with a mobile application of a mobile device. The processor can also include a second module that approves or denies access to a system resource for the mobile application, the approval or denial is based at least on the priority level, the privilege code, or the privilege code and the priority level.

According to still another aspect, provided is an apparatus that manages allocation of system resources for mobile device applications. Such apparatus can include means for associating a privilege code, a priority level, or the privilege code and the priority level with a mobile application of a mobile device and means for approving and denying access to a system resource for the mobile application, approval or denial is based at least on the priority level, the privilege code, or the privilege code and the priority level.

According to yet another implementation, disclosed is a computer program product that includes a computer-readable medium containing instructions for managing allocation of system resources for mobile device applications. The instructions can further include at least one instruction for associating a privilege code, a priority level, or the privilege code and the priority level with a mobile application of a mobile device. Additionally, the instructions can include at least one instruction for approving or denying access to a system resource for the mobile application, approval or denial is based at least on the priority level, the privilege code, or the privilege code and the priority level.

According to still a further aspect, disclosed is a method of facilitating management of a dedicated network system resource for mobile device applications. The method includes receiving a request to activate a dedicated network system resource for a mobile application and establishing the dedicated network system resource for the mobile application. Additionally, the method includes receiving a request to establish the dedicated network system resource to a second mobile application, referencing a priority level or privilege code of the second mobile application, and allowing or denying transfer of the dedicated network system resource to the second mobile application based at least in part upon the priority level or privilege code.

In accordance with still another implementation, provided is an apparatus that facilitates management of a dedicated network system resource for mobile device applications. Such an apparatus can include an input interface that receives a request to establish a dedicated network system resource for a mobile application. Furthermore, the apparatus can include memory containing at least an activation module that establishes control of a dedicated network system resource for the mobile application and a priority module that references a priority level or privilege code of the mobile application if establishing access or control of the system resource requires transfer of the system resource from a second mobile application. Additionally, the apparatus can include a processor that executes the priority module to determine a priority of the mobile application or the activation module to allow or deny transfer of the system resource based at least in part on the priority level.

According to yet another aspect, described is at least one processor that facilitates management of a dedicated network system resource for mobile device applications. The processor can include a first module that receives a request to establish a dedicated network system resource for a mobile application and a second module that establishes control of a dedicated network system resource for the mobile application. In addition, the processor can include a third module that references a priority level or privilege code of the mobile application if establishing control of the system resource requires transfer of the system resource from a second mobile application.

According to still another aspect, provided is an apparatus that facilitates management of a dedicated network system resource for mobile device applications. The apparatus includes means for receiving a request to establish a dedicated network system resource for a mobile application and means for establishing control of a dedicated network system resource for the mobile application. In addition to the foregoing, the apparatus includes means for referencing a priority level or privilege code of the mobile application if establishing control of the system resource requires transfer of the system resource from a second mobile application.

According to yet another aspect, disclosed is a computer program product having a computer-readable medium that contains instructions for facilitating management of a dedicated network system resource for mobile device applications. The instructions can comprise at least one instruction for receiving a request to establish a dedicated network system resource for a mobile application. In addition, the instructions can also comprise at least one instruction for establishing control of a dedicated network system resource for the mobile application. In addition to the foregoing, the instructions can comprise at least one instruction for referencing a priority level or privilege code of the mobile application if establishing control of the system resource requires transfer of the system resource from a second mobile application.

To the accomplishment of the foregoing and related ends, the one or more aspects comprise the features hereinafter described in more detail and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

DETAILED DESCRIPTION

Figure 1:
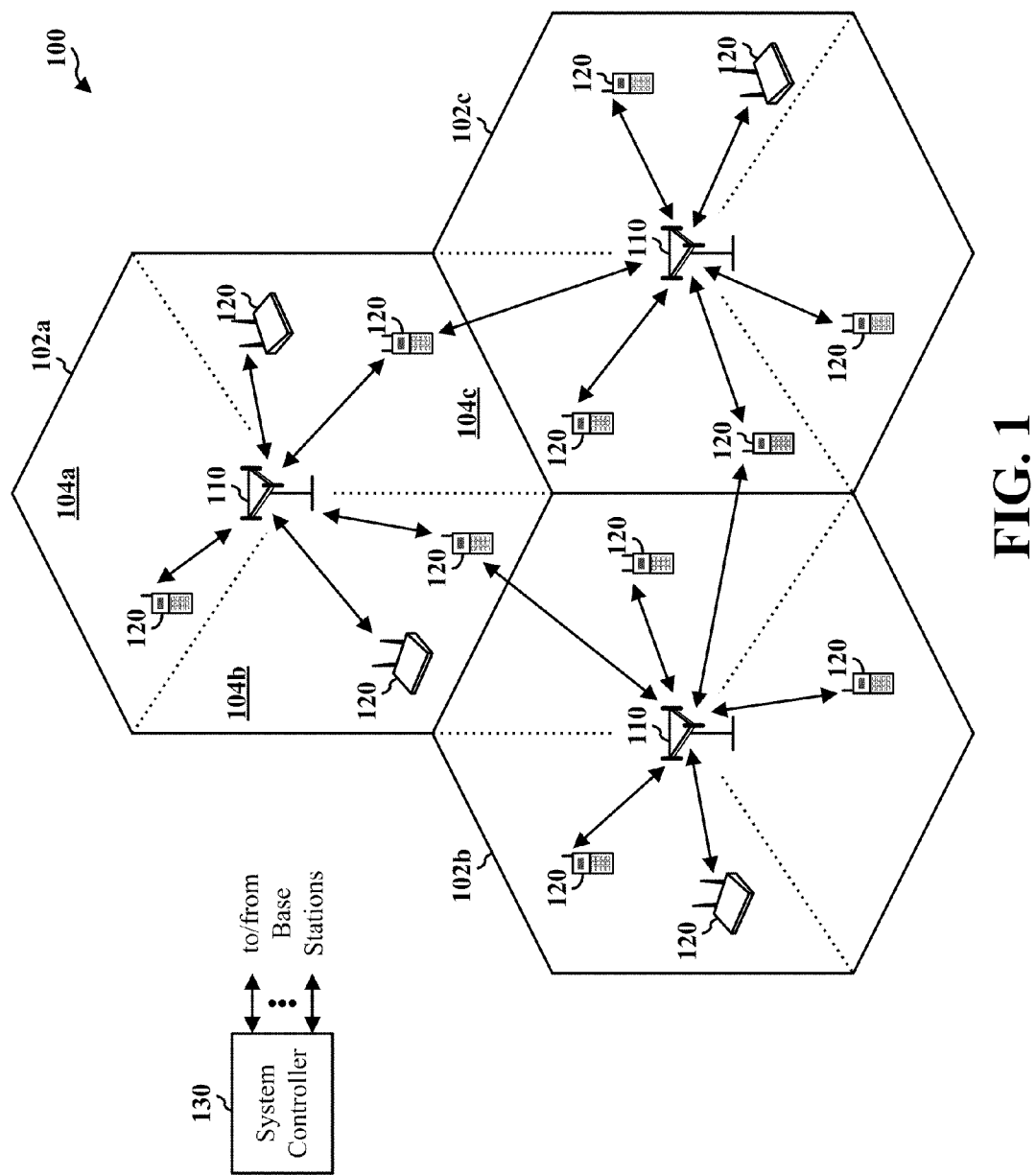
FIG. 1 illustrates a block diagram of a sample system for wireless communication between mobile devices and one or more base stations.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

Solutions for systematically multiplexing and arbitrating different system resources in a mobile environment are provided. A mobile device, similar to a modern personal computer, can implement multiple functions and applications concurrently. Relatively fast device memory and electronic processors have made multi-tasking a common feature in modern electronic communication devices. As a result, a communication device, such as a cellular telephone or multi-mode phone, can participate in voice communication via a trunc connection, reference message history (including, e.g., e-mail history, short message service (SMS) history, call history, and so forth), execute an address book application, or a combination of these or like applications at substantially the same time.

Although electronic processing and memory resources have advanced to enable application multi-tasking for communication devices, some system resources are still dedicated to a single device and/or single application. For instance, only a single radio bearer is dedicated to a single mobile device. In addition, a mobile device can only initiate a single packet data protocol (PDP) context to initiate data services (e.g., to form a connection between the mobile device and a data network, such as the Internet). Additional dedicated resources can include, but are not limited to, SMS or voice call (vocoder) support, media and/or camera support, as well as additional system software and/or hardware resources that support multiplexing functions of a communication device.

Communication device logic randomly assigns a system resource to an application that requests control of such resource. For instance, if an application requests a PDP context to initiate data services, mobile/network logic provides or denies access to the resource independent of application priority (e.g., resource access is provided on a first-come first-serve basis). As a result, a voice call can fail if a wireless application protocol (WAP) browser, providing Internet webpage services for a cellular telephone, is utilizing a required system resource. Although a service provider or consumer may place higher priority on a voice call, the mobile device and/or mobile network cannot rescind WAP browser access to the system resource (e.g., a vocoder) in order to provide a voice call application with access to the system resource instead.

The subject disclosure provides a mechanism to systematically multiplex and distribute mobile device and/or network resources (e.g., PDP context and/or other network resources for opening a data call, voice vocoder, SMS support, media and/or camera support, system software and/or hardware utilized in supporting multiplexing functions of a mobile device, and so on) for mobile applications (including, e.g., e-mail, voice call, SMS, text message, instant message (IM), camera, video recorder, message history, contact list, calendar and/or task list, etc.). Mobile applications can be provided with a priority level or a privilege code to establish a priority for such applications. In accordance with one aspect, the priority level and/or privilege code can be resource specific (e.g., each application can have a different priority for each system resource). Accordingly, an order of access can be established for control of a mobile system resource(s) such that a higher priority application is given first access if more than one application competes for the system resource(s). According to still another aspect, components can rescind access to a system resource for an application if a second application, having higher priority level and/or privilege code, requests the resource. As a result, if a voice call application is given higher priority than a WAP browser application, a WAP browser session can be interrupted so that a mobile device can support an incoming voice call, for instance.

According to yet a further aspect, a device database can store a relationship between applications and priority level(s) and/or privilege code(s), optionally as a function of resource. A system policy manager can reference such database and arbitrate access to network and/or device resources based on a requesting application's priority level and/or privilege code. If contention for a system resource occurs, a highest priority application with appropriate privilege is granted access to the system resource (e.g., voice vocoder, digital signal processor (DSP) for media encoding, PDP context, etc.).

In addition to the foregoing, priority levels and/or privilege codes can be customized for applications and system resources. For instance, a service provider can establish customization rules, specifying a priority hierarchy, for mobile applications with respect to one or more system resources. As a more specific example, a service provider can specify that a voice call application, a WAP browser application and a ringtone download application have highest, second highest, and third highest, respectively, priority with respect to a PDP context for a mobile device. The application priority need not be universal for a particular device either; the same applications (or, e.g., other applications) can have a different priority with respect to a second system resource (e.g., voice vocoder). A service provider can optionally enable a consumer to further prioritize applications with respect to system resources. For example, a consumer customization could be enabled either in a manner consistent with the service provider's priority hierarchy, or optionally in a manner that overrides the service provider's priority hierarchy with respect to one or more applications and/or system resources. Accordingly, a priority relationship between applications and system resources can be customized by service providers and/or consumers to provide flexibility and with respect to mobile device applications.

Under certain circumstances, enabling customized priority as a function of system resource can lead to device deadlock or lockup. For instance, if two applications request a pair of system resources but with conflicting priorities, the mobile operating environment (OE) can be incapable of determining which request to service first, without additional logic to distinguish between the requests. As a more particular example to illustrate the situation, application A has a higher priority for resource 1 than application B. However, application B has a higher priority for resource 2 than application A. If a mobile OE receives a request from application A to access resource 1 and a request from application B to access resource 2, concurrently, deadlock can result as each application has higher priority on the requested resource. The subject disclosure provides for giving a resource priority level to mobile device and/or mobile network resources (e.g., a PDP context, vocoder, or other suitable mobile resource as known in the art). Conflicting requests can be resolved based at least in part on a resource priority level. To illustrate, in one example, if resource 2 has higher priority than resource 1, application B can be given access in the above example, despite the higher priority of application A with respect to resource 1, because of the higher resource priority level of resource 2.

As described, the subject disclosure enables a mobile device, capable of multiple tasks and having multiple system resources, to predict and define which application has priority in resource assignment and which application(s) do not. As a result, higher priority applications need not fail simply because another, lower priority application, is utilizing a required dedicated system resource. Further, switching between different mobile application services can be efficient and reliable due to system default behavior that supports multiple active resource sharing. A system policy manager, as described herein, can delineate services into clear priority and/or privilege levels and allow policy decisions to be described around such priority levels. Thus, each service provider can easily define preferred behavior in a controlled manner.

It should be appreciated that, although drawbacks exist regarding conventional resource application logic, the current state of network communication architectures have led device manufacturers to choose to ignore the drawbacks or research solutions that are counterintuitive to those provided herein. First, resource logic is typically hard-coded into software and/or firmware and can prevent post-build configurations from modifying and/or improving application and resource management. Although inflexible, hard coded logic is cost effective and simple and, because competition is extremely high among electronic communication device providers, has helped to minimize overhead costs for such devices. For this reason, manufacturers were hesitant to modify hard coded logic solutions.

In addition to the foregoing, because mobile networks only accord a single bearer to a mobile device, resource prioritization, and distribution largely was deemed unnecessary. To an extent that prioritization was researched, it was deemed more advantageous to determine a proper application priority and hard code that priority into device logic. In such a manner, application and/or resource conflicts would not occur from one device to another, and consumers could come to expect consistent behavior from mobile devices. The subject disclosure follows a counterintuitive path in light of such prior research, however, due to the risk of unmanageable costs and/or application conflicts if a proper flexible, non-hard coded solution could not be determined.

Various aspects of the disclosure are described below. It should be apparent that the teaching herein can be embodied in a wide variety of forms and that any specific structure and/or function disclosed herein is merely representative. Based on the teachings herein one skilled in the art should appreciate that an aspect disclosed herein can be implemented independently of other aspects and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the methods, devices, systems, and apparatus described herein are described in the context of one or more mobile applications operating on a mobile device and requesting access to and/or controlling a mobile device resource or mobile network resource. One skilled in the art should appreciate that similar techniques could apply to other communication environments as well.

As used in the subject disclosure, the terms "component," "system," and the like are intended to refer to a computer-related entity, either hardware, software, software in execution, firmware, middle ware, microcode, and/or any combination thereof. For example, a component can be, but is not limited to being, a process running on a processor, a processor, an object, an executable, a thread of execution, a program, and/or a computer. One or more components can reside within a process and/or thread of execution and a component can be localized on one computer and/or distributed between two or more computers. Further, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein can be rearranged and/or complemented by additional components in order to facilitate achieving the various aspects, goals, advantages, etc., described with regard thereto, and are not limited to the precise configurations set forth in a given figure, as will be appreciated by one skilled in the art.

Additionally, the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Additionally, at least one processor can comprise one or more modules operable to perform one or more of the steps and/or actions described herein.

Furthermore, various aspects are described herein in connection with a mobile communication device (or, e.g., a mobile device). A mobile communication device can also be called a system, a subscriber unit, a subscriber station, mobile station, mobile, mobile device, cellular device, multi-mode device, remote station, remote terminal, access terminal, user terminal, user agent, a user device, or user equipment, or the like. A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

Moreover, various aspects or features described herein can be implemented as a method, apparatus, or article of manufacture using standard programming and/or engineering techniques. Further, the steps and/or actions of a method or algorithm described in connection with the aspects disclosed herein may be embodied directly in hardware, in a software module executed by a processor, or in a combination of the two. Additionally, in some aspects, the steps and/or actions of a method or algorithm may reside as at least one or any combination or set of codes and/or instructions on a machine readable medium and/or computer readable medium, which may be incorporated into a computer program product. Further, the term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

In addition to the foregoing, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, in this example, X could employ A, or X could employ B, or X could employ both A and B, and thus the statement "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of a system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring to FIG. 1, a block diagram of a system 100 is depicted for wireless communication between mobile devices and one or more base stations. Specifically, FIG. 1 illustrates a wireless communication system 100 with multiple base stations 110 and multiple terminals 120, which can be utilized in conjunction with one or more aspects. A base station 110 is generally a fixed station that communicates with the terminals 120 and can also be called an access point, a Node B, a base transceiver station, or some like terminology. Each base station 110 provides communication coverage for a particular geographic area, illustrated as three geographic areas, labeled 102a, 102b, and 102c. The term "cell" can refer to a base station and/or its coverage area depending on the context in which the term is used. To improve system capacity, a base station coverage area can be partitioned into multiple smaller areas (e.g., three smaller areas, according to cell 102a in FIG. 1), 104a, 104b, and 104c. Each smaller area can be served by a respective base transceiver subsystem (BTS). The term "sector" can refer to a BTS and/or its coverage area depending on the context in which the term is used. For a sectorized cell, the BTSs for all sectors of that cell are co-located within the base station for the cell. The transmission techniques described herein can be used for a system with sectorized cells as well as a system with un-sectorized cells. For simplicity, in the following description, the term "base station" is used generically for a fixed station that serves a sector as well as a fixed station that serves as a cell.

In one example, terminals 120 are dispersed throughout the system, and each terminal can be fixed or mobile. A terminal can also be called a mobile station, user equipment, a user device, or some other terminology, as described above. A terminal can further be a wireless device, a cellular phone, a personal digital assistant (PDA), a wireless modem card, and so on. Each terminal 120 may communicate with zero, one, or multiple base stations on the downlink and uplink at any given moment. The downlink (or forward link) refers to the communication link from the base stations to the terminals, and the uplink (or reverse link) refers to the communication link from the terminals to the base stations.

For a centralized architecture, a system controller 130 couples to base stations 110 and provides coordination and control for the base stations 110. For a distributed architecture, base stations 110 may communicate with one another as needed. Data transmission on the forward link occurs from one access point to one access terminal at or near the maximum data rate that can be supported by the forward link and/or the communication system. Additional channels of the forward link (e.g., control channel) can be transmitted from multiple access points to one access terminal. Reverse link data communication can occur from one access terminal to one or more access points.

Figure 2:
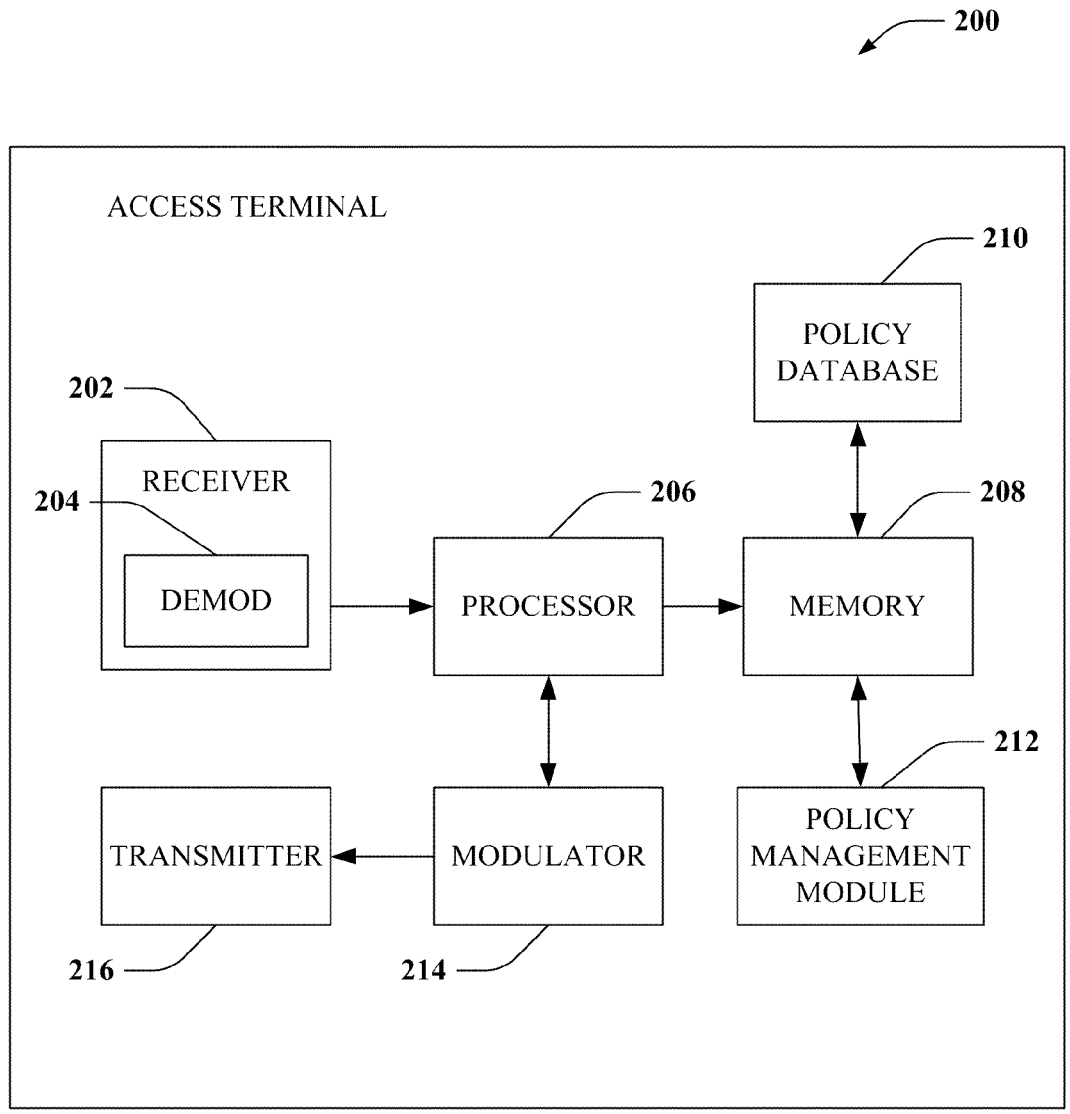
FIG. 2 depicts a block diagram of a sample access terminal in accordance with another aspect of the subject disclosure.

FIG. 2 depicts a block diagram of a sample mobile device that facilitates arbitration and prioritization of mobile resources for mobile applications. Access terminal 200 comprises a receiver 202 that receives a signal from, for instance, a receive antenna (not shown), and performs typical actions on (e.g., filters, amplifies, downconverts, etc.) the received signal. Specifically, receiver 202 can receive availability information concerning a dedicated network resource, such as a PDP context, for instance. Receiver 202 can further comprise a demodulator 204 that can demodulate received symbols and provide the symbols to a processor 206 for evaluation. Processor 206 can analyze information received by receiver 202 and/or generate information for transmission by a transmitter 216. Additionally, processor 206 can control one or more components of access terminal 200. Additionally, processor 206 can execute one or more modules, applications, or the like, that reference a priority level and/or privilege code of a mobile application to determine whether access to a requested resource should be facilitated.

Access terminal 200 can additionally comprise memory 208 that is operatively coupled to processor 206 and that can store data to be transmitted, received, and the like. Memory 208 can further store various applications, modules, and so forth, related to managing and prioritizing access to network/device resources for mobile applications, as discussed herein. Specifically, memory 208 can include a policy database 210 that associates a privilege code or a priority level, or both, with at least one mobile application (e.g., voice calling, e-mail, SMS, camera, video recorder, message history, phone book, calendar and/or appointment organizer, task organizer, and so on) of a mobile device. The privilege code and/or priority level can be specific to a particular device/network resource(s) (e.g., PDP context, voice vocoder, and so on), or constant with respect to mobile resources. The priority level stored within the policy database 210 establishes a relative order of importance for the mobile application with respect to other mobile applications. As a result, if the mobile application requests access to a mobile resource and has a higher order of importance than a competing application, the mobile application will be provided the access (e.g., by policy management module 212). If, however, the competing application has a higher priority level, the mobile application will be denied access.

Memory 208 can also include a policy management module 212. Policy management module 212 can approve or deny access to a mobile device resource and/or mobile network resource for a mobile application. In addition, approval or denial can be based at least in part on a priority level or a privilege code associated with the mobile application. Particularly, the policy management module 212 can receive a request initiated by a mobile application to control a resource. The module 212 can then reference the policy database 210 to determine a priority level and/or privilege code associated with the mobile application. The privilege code can indicate whether the application is authorized to access the resource (e.g., whether the application is approved by a network service provider, accepted by a consumer, contains a valid digital certificate of authenticity, and so on). If the application is privileged to access the resource, policy management module 210 can then determine whether the resource is available for use, concurrently in use by another mobile application, or whether a competing request for the resource exists. If the resource is available, policy management module 212 provides the mobile application access to the resource.

If policy management module 212 receives a request to control a resource when the resource is in use or a competing request exists, an application with higher priority is accorded access to the resource. For instance, a priority level of multiple requesting applications can be referenced at the policy database 210, and the application having the highest priority level can be provided access to the resource. Alternatively, or in addition, if the resource is concurrently controlled by another application, the priority level of the (highest) requesting application can be compared with the priority level of the controlling application. If the requesting application has higher priority level, access to the resource can be revoked for the controlling application and provided to the requesting application instead. Otherwise, the requesting application is denied access to the resource. As a result, mobile device 200 can arbitrate among various requesting and/or controlling applications and provide access to a contested resource to a higher priority application, rather than to a random application or a first in time application.

It will be appreciated that the data store (e.g., memory 208) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 208 of the subject systems and methods is intended to comprise, without being limited to, these and any other suitable types of memory.

Receiver 202 is further operatively coupled to feedback analyzer 210 that can provide feedback data related to a missing portion of a transmission (e.g., an un-received SFN data packet) or a portion of a transmission deemed indecipherable, to one or more of a plurality of access point transmitters. A data organizer 212 can incorporate a subsequently received, missing portion of a transmission into previously received data associated with the transmission (e.g., a re-transmitted SFN data packet can be re-incorporated into a prior SFN transmission).

Access terminal 200 still further comprises a modulator 214 and a transmitter 216 that transmits the signal to, for instance, a base station, an access point, another access terminal, a remote agent, etc. Although depicted as being separate from the processor 206, it is to be appreciated that signal generator 210 and indicator evaluator 212 may be part of processor 206 or a number of processors (not shown).

Figure 3:
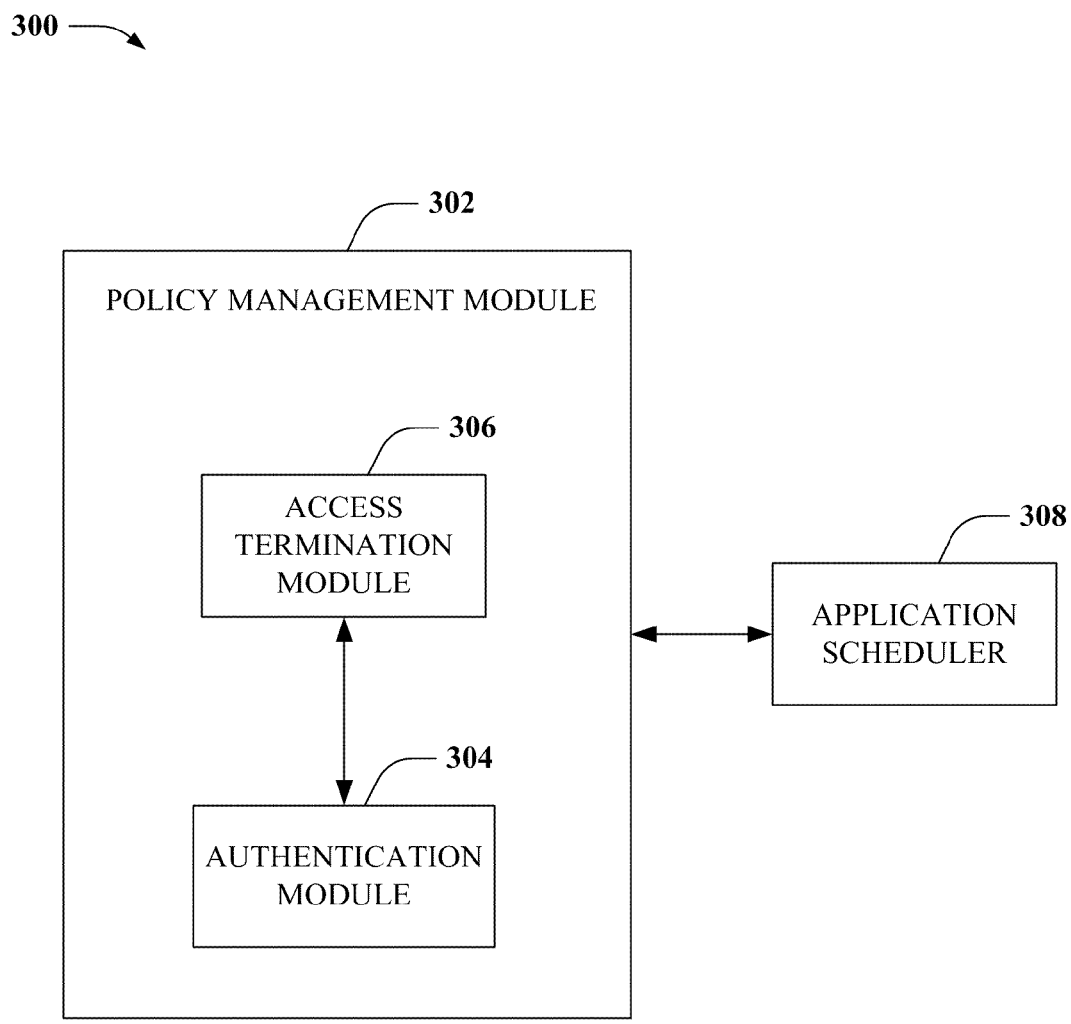
FIG. 3 illustrates a block diagram of an example policy management module according to yet another aspect.

FIG. 3 illustrates a block diagram of a system 300 including a particular policy management module 302 according to another aspect of the subject disclosure. In one implementation, policy management module 302 can provide access to a device and/or network mobile resource (e.g., PDP context, voice vocoder, optical recording device for camera or video, SMS service, or the like) and arbitrate among multiple competing requests for one or more resources, as described herein. Accordingly, system 300 can provide access to limited resources for high priority applications and facilitate an efficient and reliable transition from one application to another.

Policy management module 302 can include an authentication module 304 that verifies a privilege code of a mobile application. The privilege code can be utilized to indicate that the mobile application is approved by a mobile device manufacturer, network service provider, mobile communication service provider, mobile device user (e.g., consumer), or a combination thereof or of the like. For instance, if a service provider approves of a particular mobile application (e.g., developed by the service provider, a partner of the service provider, and so on), the mobile application can be given a privilege code indicating that the mobile application is trusted and can be provided access to mobile system resources. Alternatively, or in addition, if a consumer downloads, loads, and/or installs an application onto a mobile device, the authentication module 304 can provide an appropriate privilege code indicating consumer/user acceptance. If the mobile application subsequently makes a request to control a mobile system resource in conjunction with executing a function of the application, authentication module 304 can accord the mobile application with an access commensurate with the privilege code.

In addition to the foregoing, the privilege code can be provided with and/or include additional security in order to protect the integrity of mobile applications and/or device/network resources that are accorded privilege by way of the privilege code. For instance, a cryptographic signature (e.g., commercial grade or better, such as that generated with a class III certificate provided by Verisign or the like) can be incorporated into the privilege code. Authentication module 304 can then verify the cryptographic signature in order to determine that the privilege code associated with an application is valid and authentic. It should be appreciated that various mechanisms for cryptographically coding, signing and decoding digital signatures, as known in the art, can be utilized to sign, code and/or decode privilege codes of mobile applications, as suitable to the descriptions and functions of such codes and/or applications provided herein.

In general, a privilege code can provide a level of authenticity for a mobile application. The privilege code can also indicate what system resources should be accorded to a mobile application having a certain privilege code. In one exemplary aspect, a policy database (e.g., as indicated at 210 of FIG. 2, supra) can store three privilege codes, A, B and C for instance. Privilege codes A, B and C can authenticate mobile applications for three groups of mobile system resources. Code A can authenticate access for a first group of resources, Code B can authenticate access for the first group and a second group, and Code C can authenticate access for all three groups of resources. Thus, a mobile application can be authenticated to access a mobile resource correlated to a privilege code assigned to the mobile application. The privilege code is provided to authentication module 304 upon initiation of a request to access a system resource. Authentication module 304 therefore, can reference a policy database to determine whether the privilege code is valid, optionally what class it belongs to (e.g., class A providing access to a first group of system resources, and so on), and whether the privilege code enables access to the system resource. If not, the request can be denied. If so, the request can be arbitrated and/or managed by the policy management module 302, as described herein.

Also included within the policy management module 302 is an access termination module 306 that can remove access to a system resource. Specifically, if policy management module 302 receives a request for a device and/or network resource while a mobile application is utilizing the resource, access termination module 306 can remove the utilizing module's access to the resource. For example, a first mobile application requests control of a system resource, is authenticated (e.g., as discussed above, optionally specific to the resource) and is provided control of the resource. While the resource is controlled by the first mobile application, a second mobile application requests control of such resource. Authentication module 306 determines whether the second mobile application is privileged to access the resource, as discussed above. If not the request is terminated, if so, policy management module 302 determines priority levels for the first and second mobile application. If the second mobile application has higher priority, access termination module 306 can revoke control of the resource for the first mobile application so that the higher priority, second mobile application can be accorded access to the resource instead. Accordingly, access termination module 306 provides smooth and efficient transition from a low priority application to a higher priority application. Specifically, by facilitating transfer of the resource without waiting for the low priority application to relinquish control of the resource, efficient high priority transfer can be accomplished.

According to another aspect, system 300 can include an application scheduler 308. The application scheduler 308 can re-initiate a resource request for a mobile application if access to a requested system resource is denied. For instance, if a system resource is being controlled by a higher priority application, a requesting application will be denied access to the resource, as described herein. However, once the resource is uncontrolled (or, e.g., controlled by a lower priority system resource), the mobile application can be able to access that resource. If the requesting application is not provided with an indication that the resource is no longer in use, transitioning control of the resource from the controlling application to the requesting application can be delayed. As a result, application scheduler 308 can periodically re-initiate resource requests for the requesting application in order to provide a more efficient transition. According to another aspect, the application scheduler 308 can receive an indication that the resource is ready for use (e.g., from the resource itself, the controlling application, or any suitable entity that can determine when the resource is not in use and provide an indication thereof) and re-initiate the request. It should be appreciated that application scheduler 308 can manage periodic request re-initiation for multiple mobile applications concurrently. Accordingly, downtime related to competing with higher priority applications for a system resource can be substantially minimized by system 300.

Figure 4:
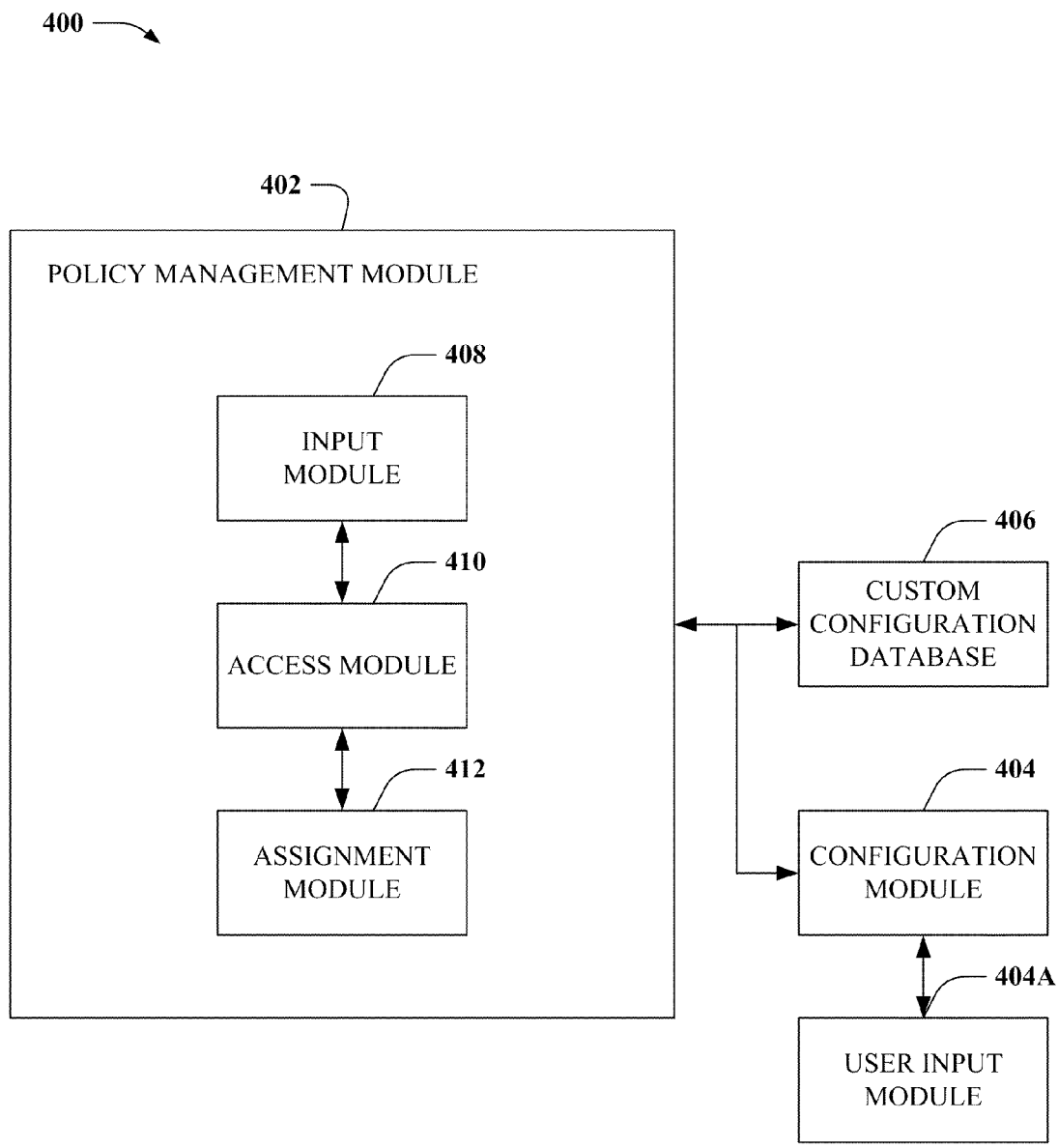
FIG. 4 illustrates a block diagram of an example system that can customize priority levels and/or policy codes of mobile applications according to still another aspect.

FIG. 4 illustrates a block diagram of an exemplary system 400 that can customize and/or update priority levels and/or policy codes of mobile applications according to a further aspect. System 400 can include a policy management module 402 that arbitrates and manages access to device or network system resources for mobile applications, as described herein. The policy management module 402 can further include components (408, 410, and 412) that enable priority levels and/or privilege codes of mobile applications to be customized and/or updated. As a result, a network service provider or a mobile device user, or both, can specify application priority and/or privilege access for mobile applications with respect to one or more mobile system resources (e.g., a set of predetermined applications, or an application tested by the service provider for compatibility with network components, an application downloaded by a device user and installed on a mobile device, and so on).

Policy management module 402 can include a configuration module 404 that provides customization of privilege code or priority level information for one or more mobile applications. The configuration module 404 can enable a user to set and/or modify a priority level of a mobile application, optionally as a function of mobile resource. As a particular example to illustrate the foregoing, mobile application A has a priority level of 5 (e.g., a lowest priority in a range of 1 through 5), and mobile application B has a priority level of 2. Configuration module 404 can enable a user to alter these (and, e.g., other suitable application priority levels) levels in order to customize application priority. Specifically, if the user desired application A to have higher priority for mobile resources than application B, the priority level of application A can be raised (e.g., to 1, or a higher priority than that accorded to application B in the range of 1 through 5), the priority level of application B can be lowered (e.g., to 5), or any suitable combination thereof.

According to additional embodiments, mobile applications can have multiple priority levels for multiple mobile system resources. As a further example, mobile application A can have a priority level of 2 for a PDP context, and a priority level of 4 for a voice vocoder. Mobile application B can have a priority level of 4 for the PDP context, and a priority level of 3 for the voice vocoder. Configuration module 404 can enable a user to modify the priority level(s) of mobile applications as a function of system resource. Thus, if a user desires mobile application B to have higher priority for the PDP context, but lower priority for the voice vocoder than mobile application A, configuration module 404 can enable adjustment of the priority level(s) to accommodate the desired priority.

According to still another aspect of the subject disclosure, configuration module 404 can enable customization of application privilege code. For instance, a user can specify that an application should or should not be privileged to access mobile system resources associated with a mobile device or related network. Configuration module 404 can update privilege code(s) of the application accordingly. According to another aspect, privilege codes providing access to one or more groups of applications can be customized. For instance, a privilege code associated with a mobile application can indicate that a first group and a second group of system resources (e.g., including a voice vocoder and optical imaging resources) can be accessed by applications having the privilege code, but not a third group of applications (e.g., including a PDP context). If a user (e.g., a service provider) desires an application to have access to the third group of resources, configuration module 404 can adjust the privilege code of the application accordingly.

According to a further implementation, configuration module 404 can establish a plurality of customization user levels. The user levels can enable a varying degree of customization for mobile applications and/or mobile resources. For instance, a first level of customization, for network service providers, can provide full access to customizing priority levels and/or privilege codes of any suitable mobile application (e.g., e-mail, voice call, SMS, etc.) for any suitable mobile resource (e.g., PDP context, voice or SMS decoder, and so forth). In addition, the network service provider customization could optionally provide limitations on a degree of customization afforded to non-first level users (e.g., consumers). Specifically, such customization can limit modification of custom priority levels and/or privilege codes established by the network service provider for one or more mobile applications or mobile system resources.

In addition to the foregoing, a second level of customization, for mobile device consumers/users, can provide a customization to a lesser degree than the first level of customization. The second level can enable modification of priority levels and/or privilege codes for applications and system resources that are not restricted by a default second level customization restriction or a customization restriction set by a network service provider, for instance. Thus, a consumer/user could download an application and give the application a particular privilege code (e.g., authorizing access to a set of mobile system resources) and a particular priority level (e.g., relative to other applications that compete for system resources), so long as the application, privilege code and/or priority level are not restricted. Consequently, system 400 can provide for flexible arbitration and management of application access to mobile system resources.

According to still other embodiments, configuration module 404 can enable modification and/or updating of one or more priority codes (e.g., a list of priority codes) based on a concurrent state of the OE of a mobile device. Mobile OE states can be distinguished based on execution of one or a combination of multiple mobile applications (e.g., activation of a web browser), mobile OE access to one or more device and/or network resources (e.g., PDP context), user input (e.g., an alternate priority profile provided by a user), or a combination thereof or of the like. For instance, if a voice over Internet Protocol (VoIP) call is activated, a privilege level of an IMS application (that is active on the mobile OE, but is not of high priority) can be set higher than an Internet browser. As a result, the IMS application could be provided access to one or more resources instead of the Internet browser (e.g., a PDP context) while the VoIP call is active. Additionally, modified priority codes can be resource specific, as described herein. Accordingly, by being able to dynamically update priorities of one or more applications as a function of mobile OE state, system 400 can provide useful flexibility, and serve consumer/service provider needs for a wide range of requirements and use cases.

According to one or more specific aspects, modification or update of priority level(s) of one or more applications can be made based on concurrent state of a mobile OE by assigning a dynamic priority to such application(s). Dynamic priority can be based on an application number, which is a static code that provides a default level of priority for the application, and a state number, which provides a dynamic code that changes based on the concurrent state of the mobile OE. The state number can modify (e.g., raise or lower) the dynamic priority of an application as a function of the concurrent state. As a particular example, a media player application can be used to play back both music and ringtones. If the state number indicates that the media player has to play back a ringtone, the dynamic priority for the media player with respect to a digital signal processor can be increased over a default state associated with playing back music.

In addition to the foregoing, system 400 can include a custom configuration database 406 that stores a predetermined privilege code or priority level relationship for a set of predetermined mobile applications. The predetermined relationship(s) can be provided by a mobile device manufacturer or network service provider, for instance, as suitable (e.g., if application management and/or arbitration logic is conducted at a mobile device or components of a mobile network). According to one exemplary aspect, configuration module 404 can provide custom access to the predetermined relationship(s) by way of user input module 404A. The custom access can enable a user (e.g., service provider or consumer) to modify priority level/privilege code of one or more applications with respect to one or more system resources, as described herein. Accordingly, the predetermined relationship(s) can establish an initial, default priority, and privilege of mobile applications for one or more system resources, which can be customized for added flexibility.

According to a further aspect, policy management module 402 can include components (408, 410, 412) providing an interface to configuration module 404. For instance, policy management module can include an access module that defines multiple levels of customization access for users and/or service providers. Specifically, the access module 410 can define at least a network provider level of access and a consumer level of access for customization of privilege and/or priority information (e.g., stored within a policy database 210, see FIG. 2, supra). Furthermore, policy management module can include an input module 408 that receives information pertaining to user level of access. As an example, the input component 408 can receive user information indicating a network service provider level of access or consumer/user level of access for the user (discussed above). Additionally, the policy management module 402 can include an assignment module 412 that accords a network provider or consumer level of access to a user. The assignment module can receive the information pertaining to user level of access from the input module 408, and accord the level of access commensurate with such information. Accordingly, system 400 can receive information such as login name and related level of customization access, and provide a predetermined level of access to a user. It should be appreciated that any suitable variation in access distinction and/or customization rights for establishing priority and/or privilege for mobile applications with respect to mobile system resources can be included. The subject innovation is not limited to the specific levels of access (e.g., network service provider, consumer/user) articulated herein; other suitable levels of access are incorporated into the subject disclosure.

Figure 5:
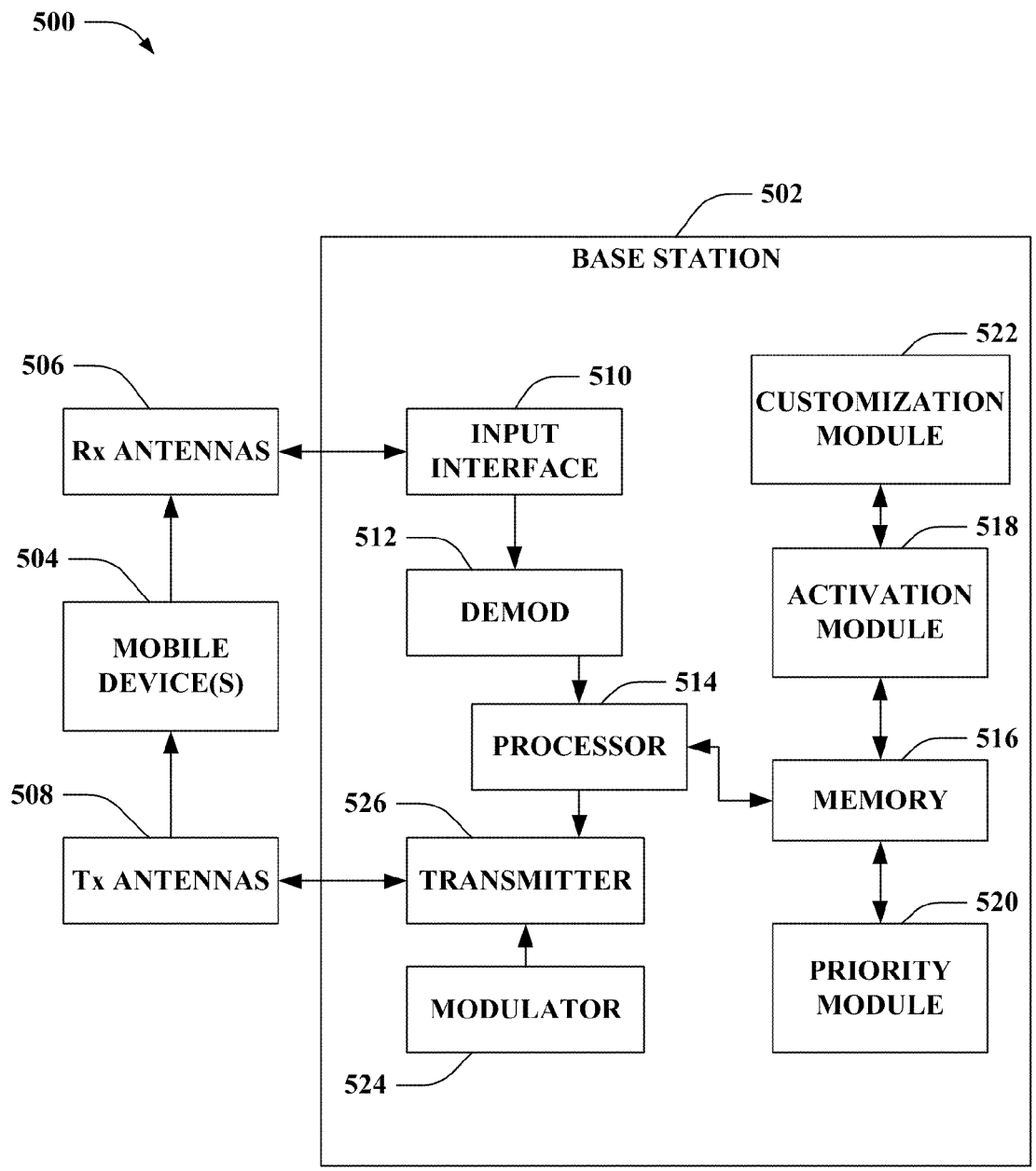
FIG. 5 depicts a block diagram of a sample base station according to yet another aspect.

FIG. 5 depicts a block diagram of a sample base station according to one or more aspects. System 500 comprises a base station 502 (e.g., access point, etc.) with an input interface 510 that receives signal(s) from one or more mobile devices 504 through a plurality of receive antennas 506, and a transmitter 522 that transmits to the one or more mobile devices 504 through a transmit antenna 508. Input interface 510 can receive information from receive antennas 506, specifically, at least a request to establish access to and/or control of a dedicated network resource (e.g., PDP context, SMS or voice decoder, such as a voice codec or data decoder, or other network resource) for a mobile application (e.g., e-mail, an Internet browser such as a WAP browser, SMS, IM, text message, etc.). Additionally, input interface 510 is operatively associated with a demodulator 512 that demodulates received information. Demodulated symbols are analyzed by a processor 514 that is coupled to a memory 516 that stores information and/or application modules (518, 520, and 522) associated with arbitrating and/or managing control of dedicated network resources for mobile applications, as described herein. For instance, the information and/or modules (518, 520, 522) can relate to providing the applications with access to a system resource(s), determining priority of competing application requests, revoking resource access in favor of a higher priority application, customizing priority levels and/or privilege codes of one or more applications relative to one or more resources, and/or any other suitable information related to performing the various actions and functions set forth herein.

Memory 516 can include at least an activation module 518 and a priority module 520 stored therein. The activation module 518 can establish control of a dedicated network resource for a mobile application. For instance, the activation module 518 can determine whether a system resource is available for use, or receive a determination that the mobile application is a high priority request, and establish the mobile application as a controlling application for the resource. The mobile application can then access and take control of the resource. Further, the activation module can affiliate an application ID of the mobile application with the dedicated network resource to indicate to other applications and/or components what application is controlling the resource (including, e.g., a priority level of the application). According to one implementation, if access to a system resource is revoked or transferred from the mobile application, the activation module 518 can also remove the affiliation between the dedicated network resource and the application ID of the mobile application.

The priority module 520 stored in memory 516 can reference a priority level or privilege code of at least one mobile application. Priority levels and/or privilege codes of mobile applications can be utilized to determine a high priority application in the event that two or more applications compete for a dedicated system resource, as described herein. An application ID of the high priority application can be forwarded to activation module 518 to establish access and control of such system resource for the high priority application. Additionally, a priority level of a controlling application (e.g., an application concurrently controlling a system resource) can be referenced by priority module 520. Specifically, if the mobile application requests access to the resource while the controlling module has control of the resource, priority module 520 can compare the controlling and requesting applications' priority levels to determine a high priority application. If the controlling application is the high priority application, the request can be denied. If the requesting application is the high priority application, activation module 518 can be notified, and access to the resource can be revoked for the controlling application and provided to the requesting application. According to one aspect, priority module 520 can reference a privilege code of a requesting application(s) prior to control of the dedicated network resource being established by the activation module for the requesting mobile application. The privilege code can verify whether the requesting application is authorized to access the dedicated network resource, for instance.

Memory 516 can also include a customization module 522. Customization module 522 can enable user customization of at least the priority level and/or privilege code of one or more applications. As an example, the application priority levels and/or privilege codes can be particular to various resources, allowing different priority and privilege for each resource or group of resources. According to a further example, various levels of customization can be provided, where a level offers a distinct degree of access to customization of priority level and/or privilege code. Further, the degree(s) of access can pertain to one or more mobile applications and/or dedicated network resources, as described herein or made known to one of skill in the art by way of the aspects disclosed herein. Particularly, the customization module can establish at least a network service provider level of customization and a consumer level of customization for network service providers or consumers, respectively, to set priority levels or privilege codes for mobile applications. According to still another implementation, the customization module 522 can include a default set of privilege codes or priority levels for a predetermined set of mobile applications. The default set can optionally be adjusted by a network service provider and/or consumer for further flexibility and efficiency.

It is to be understood that the aspects described herein may be implemented in hardware, software, firmware, middleware, microcode, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the aspects are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Referring to FIGS. 6-9, methodologies relating to managing, arbitrating, and/or customizing access to mobile system resources for one or more mobile applications are depicted, according to one or more aspects. While, for purposes of simplicity of explanation, the methodologies are shown and described as a series of acts, it is to be understood and appreciated that the methodologies are not limited by the order of acts. For example, in accordance with one or more aspects, some acts can occur in different orders and/or concurrently with other acts from that shown and described herein. In addition, those skilled in the art will understand and appreciate that a methodology could alternatively be represented as a series of interrelated states or events, such as in a state diagram. Moreover, not all illustrated acts are necessarily required to implement a methodology in accordance with one or more aspects.

Figure 6:
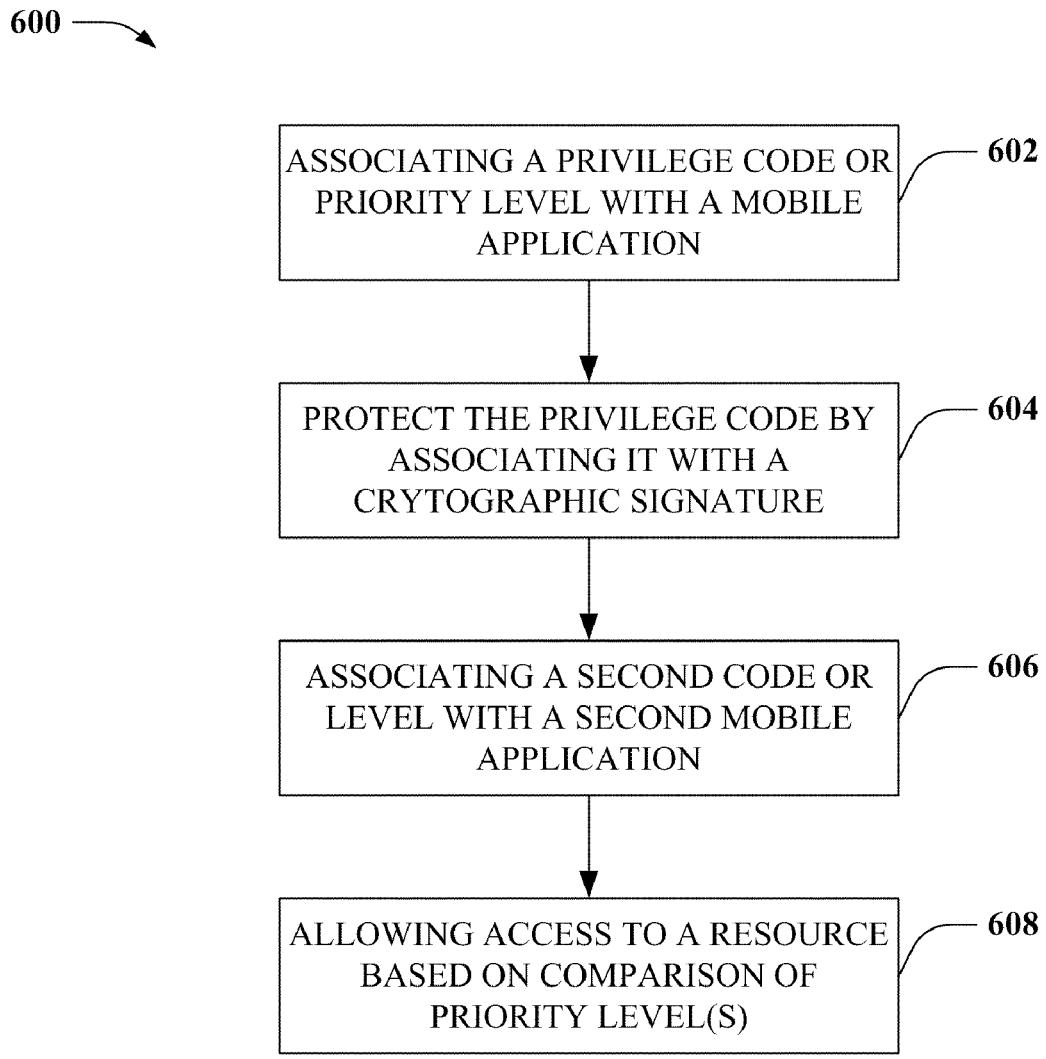
FIG. 6 illustrates a flowchart of a sample methodology for providing access to mobile system resources based on application priority, in accordance with one aspect.

FIG. 6 illustrates a flowchart of a sample methodology 600 for providing access to mobile system resources based on application priority. Method 600, at 602, can associate a privilege code or priority level with a mobile application. The mobile application can include, but is not limited to, e-mail, voice call, SMS, text message, IM, camera, video recorder, message history, contact list, calendar and/or task list applications, etc. A privilege code can provide a relative ranking of application priority with respect to other mobile applications. The privilege code can be independent of other system components (e.g., a requested resource, such as a PDP context, or other network resources for opening a data call, voice vocoder, SMS support or data decoder, media and/or camera support resource, system software and/or hardware related to mobile device function multiplexing, and so on), or can be specific to a mobile system resource or group of system resources. According to one implementation, each mobile application can have a different priority level for each available mobile system resource.

A privilege code associated with the mobile application at reference number 602 can indicate authorization to access a particular mobile network and/or mobile device resource. For instance, the privilege code can be accorded to the mobile application as a result of action taken by a network service provider (e.g., testing the application to determine whether the source of the application is trustworthy and/or whether the operation of the application is compatible with the mobile device and other applications or components thereof). Alternatively, or in addition, the privilege code can be accorded because of a consumer downloading, installing, and/or approving of the mobile application. According to another aspect, the privilege code can indicate a hierarchical authorization to one or more applications or groups of applications. For instance, one privilege code can authorize access to a first set of mobile system resources, while another privilege code can authorize access to the first set and a second set of mobile system resources, and so on.

Method 600, at 604, can protect a privilege code(s) accorded to an application or group of applications with a cryptographic signature. The cryptographic signature can be included with the privilege code(s) in a request to access a mobile resource. By receiving and decoding the signature, a mobile OE can determine whether a requesting application is indeed authorized to be accorded a level of privilege associated with the privilege code. At 606, method 600 can associate a second privilege code or priority level with a second mobile application. The privilege code(s) and/or priority level (s) associated with the second mobile application can be substantially similar to that discussed above. At 608, access to a mobile network and/or device resource can be allowed based on comparison of at least the priority level(s) of the mobile application and the second mobile application. Particularly, if the mobile application has higher priority level than the second mobile application (optionally with respect to the resource), access, and control of the resource can be provided to the mobile application and denied to the second mobile application. As a result, methodology 600 can provide for management and/or arbitration of competing requests to control a dedicated system resource. The management can be a function of application priority and/or privilege code, enabling a higher priority application to access the resource over a lower priority application. As a result, information and applications more important to a service provider's business and/or a consumers use of a device can be provided in a more reliable manner compared with conventional mechanisms for managing competing system resources.

Figure 7:
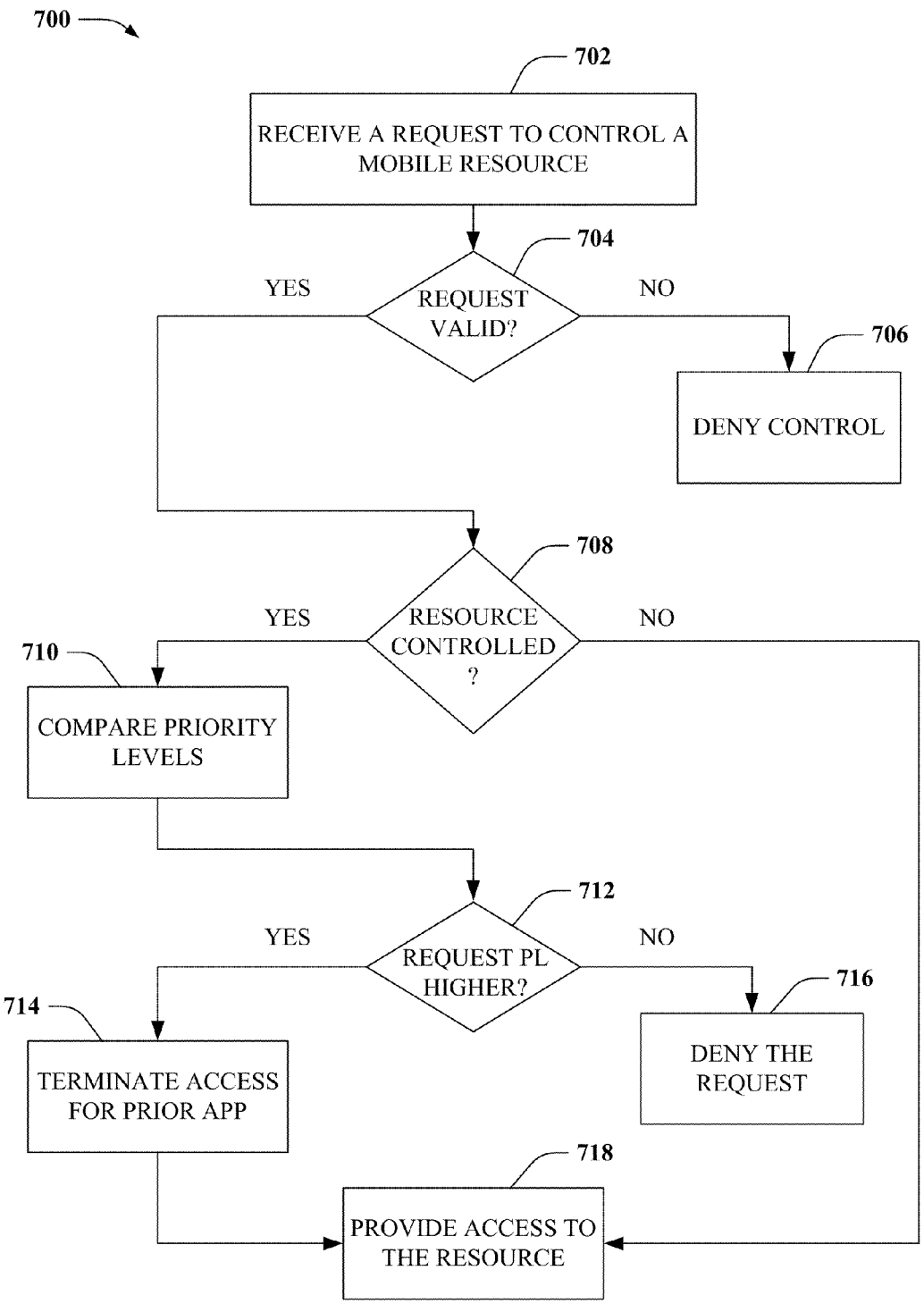
FIG. 7 depicts a flowchart of a sample methodology for determining whether a mobile application can access a dedicated mobile system resource, in accordance with another aspect.

FIG. 7 depicts a flowchart of a sample methodology 700 for determining whether a mobile application can access a dedicated mobile system resource. Method 700, at 702, can receive a request to control a mobile system resource. The request can be from one or more mobile applications operating on a mobile device and/or related to remote mobile network communication. At 704, a determination is made as to whether the request is valid. Particularly, a privilege code of a requesting application can be referenced. If the privilege code provides authorization for the requesting application to access a specified system resource, the request can be deemed valid. If the request is not valid, methodology 700 proceeds to 706 where control of the specified resource is denied the requesting application. If the request is valid, methodology 700 can proceed to reference number 708.

At 708, method 700 can determine whether the mobile resource (e.g., specified within the request received at reference number 702) is concurrently controlled (e.g., by another mobile application). If the mobile resource is not concurrently controlled, method 700 can proceed to reference number 718 where access to the mobile resource is provided (e.g., to a requesting mobile application). If, at reference number 708, the resource is determined to be concurrently controlled, methodology 700 can proceed to 710, where priority levels of a mobile application requesting access to the mobile resource and of a mobile application controlling the resource can be compared.

At 712, a determination is made as to whether the requesting application has a higher priority level than the controlling application. If not, methodology 700 can proceed to 716 where the request to control the mobile resource is denied. If the requesting application does have higher priority, methodology 700 can proceed to 714 where access to the mobile resource is terminated for the controlling application. At 718, access to the mobile application can then be provided to the requesting application. As described, method 700 provides for determining authenticity of a request to control a mobile system resource. In addition, the method 700 can determine whether a system resource is concurrently controlled, and arbitrate control of, and access to the resource based on priority. Accordingly, higher priority applications can be given access to/control of a system resource, even if the system resource is concurrently controlled by another application.

Figure 8:
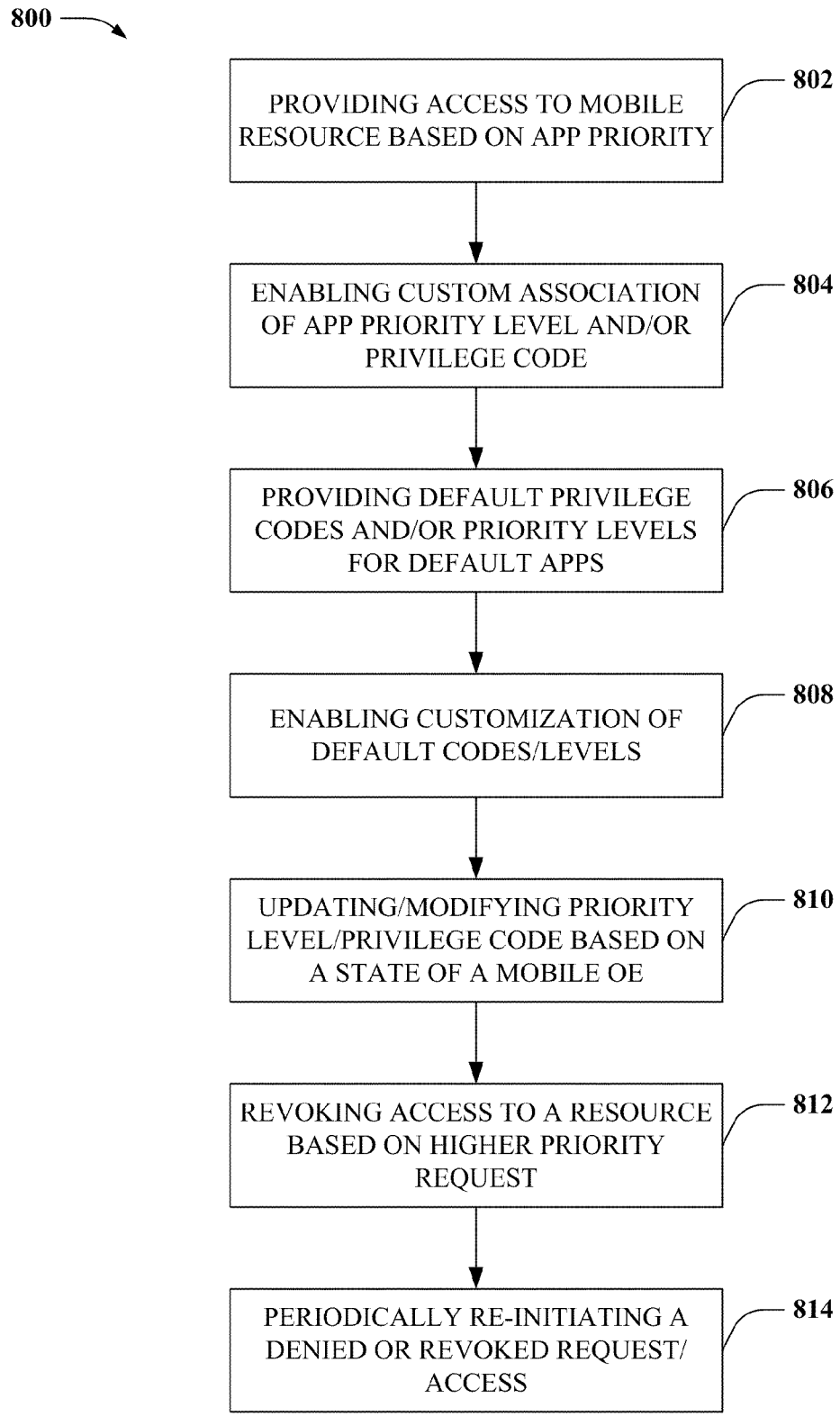
FIG. 8 illustrates a flowchart of an example methodology for customizing mobile application priority and providing access based on priority, in accordance with yet another aspect.

FIG. 8 illustrates a flowchart of an example methodology for customizing mobile application priority and providing access based on priority. Method 800, at 802, can provide access to a mobile system resource based on application priority, as described herein. At 804, custom association of application priority level(s) and/or privilege code(s) can be enabled. For instance, a user or network service provider, or other suitable device user, retailer or distributor, etc., can establish custom priority levels or privilege codes for one or more mobile applications, as described herein. The priority levels and/or privilege codes can pertain to all available mobile system resources, or can be specific to one or more mobile system resources or groups of resources.

At 806, method 800 can provide default privilege codes and/or priority levels for a default set of mobile applications. The default privilege codes and/or priority levels can be shipped with a device or mobile network component, for instance, providing predetermined relationships between a set of mobile applications and priority and privilege for such applications in accessing mobile system resources. At 808, customization of the default codes/levels can be enabled. Particularly, a device user (described above) can modify the default relationships to customize a device according to the user's sales, marketing, and/or operational requirements, or personal use requirements, as suitable. At 810, one or more priority levels can be updated/modified based on a concurrent state of a mobile OE. For instance, a priority level of an application or a group of applications can be dynamically updated based on activation of one or more other applications, based on access to a particular network/device resource, and/ or user input.

At 812, access to the system resource can be revoked based on higher priority request. For instance, if a consumer activates a first application that requires access to a mobile system resource that is concurrently controlled by a second application, and the first application has higher priority, access to the system resource can be revoked from the second application and provided to the first application. At 812, a denied request or revoked access to a mobile system resource can be periodically re-initiated or requested, respectively. Periodically requesting access to the system resource can facilitate efficient resource management by decreasing resource downtime. To continue the foregoing example, if the controlling application has access to the mobile resource revoked (e.g., as indicated at reference number 810), a request to re-establish access to the mobile resource for the controlling application can be automatically re-initiated periodically. Accordingly, the controlling application can re-access the resource when it is no longer in use (or, e.g., controlled by a lower priority application).

Figure 9:
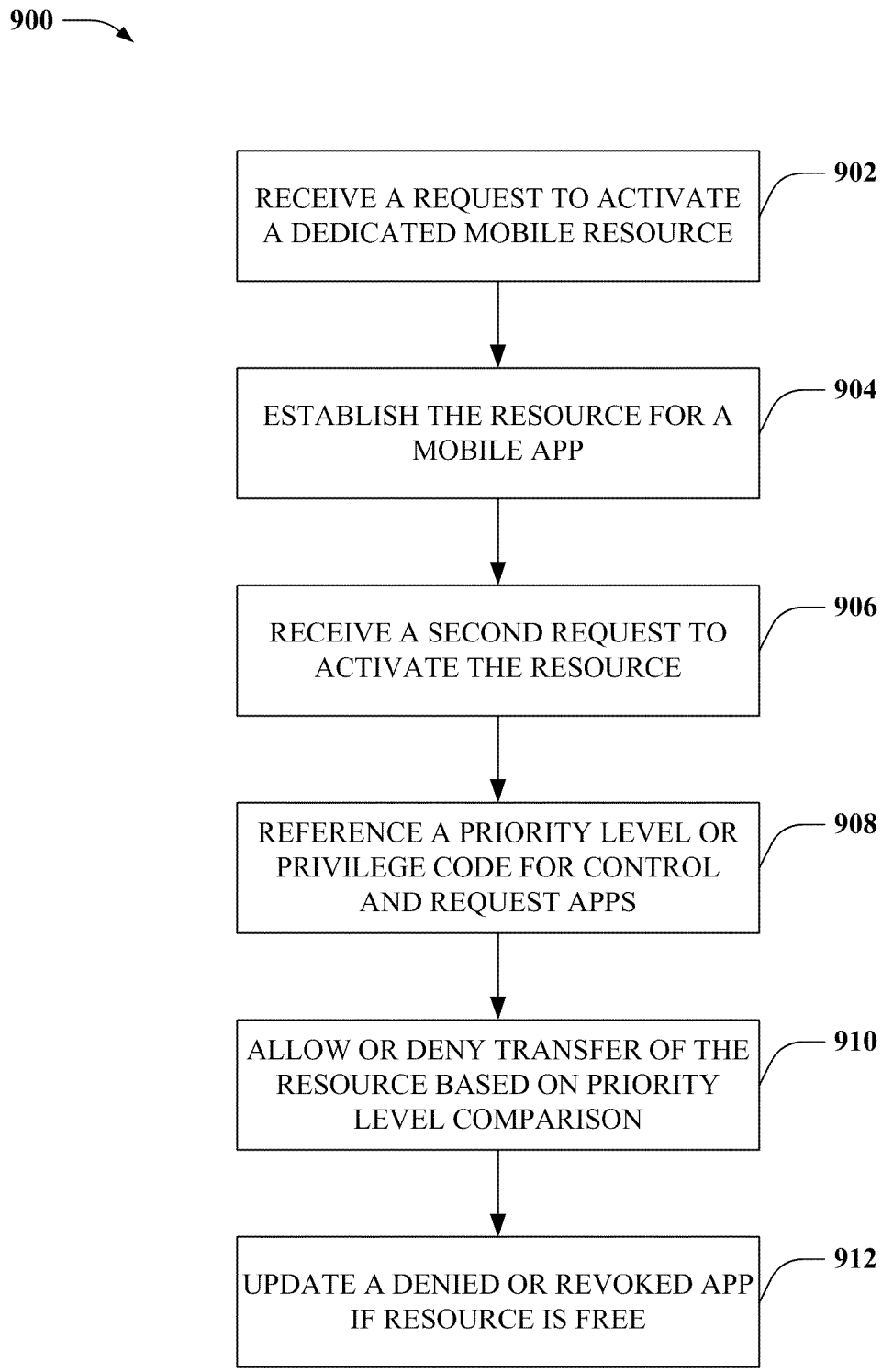
FIG. 9 depicts a flowchart of a sample methodology for determining access to a dedicated system resource for competing applications attempting to control a system resource, in accordance with still another aspect.

FIG. 9 depicts a flowchart of a sample methodology 900 for determining access to a dedicated system resource for competing applications attempting to control a system resource. Method 900, at 902, can receive a request to activate a dedicated mobile system resource. The request can be received, for instance, at a component of a mobile network. At 904, the resource can be established for the requesting mobile application. At 906, a second request can be received to activate the mobile resource. Such request can be from another mobile application, distinct from the application providing the initial request received at reference number 902. At 908, a priority level or privilege code, or both, of the controlling and requesting applications can be referenced. At 910, transfer of the resource from the controlling application to the requesting application can be allowed or denied based at least upon comparison of the priority levels. For instance, if the requesting application has a higher priority level, the transfer can be allowed. If the requesting application has a lower priority level, the transfer can be denied. At 912, a denied or revoked application can be updated once the resource is not in use. Particularly, if a request to control a system resource is denied or access to a resource is revoked, an ID of the requesting/controlling application (and, e.g., a priority level of such application) can be stored. Then, once the mobile resource is no longer in use (or, e.g., once the mobile resource is controlled by an application with lower priority), the requesting/controlling application can be updated that access to the resource is available for such application. Accordingly, method 900 can arbitrate control of a system resource to a high priority application as well as minimize resource downtime by notifying competing applications when the resource is subsequently available.

Figure 10:
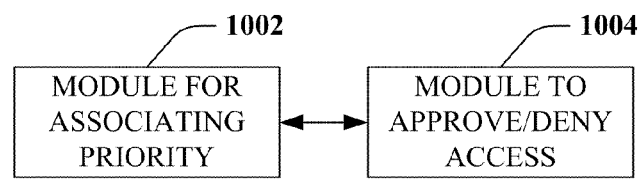
FIGS. 10 and 11 illustrate block diagrams of sample systems for establishing access to mobile system resources based on application priority, according to yet another aspect.
Figure 11:
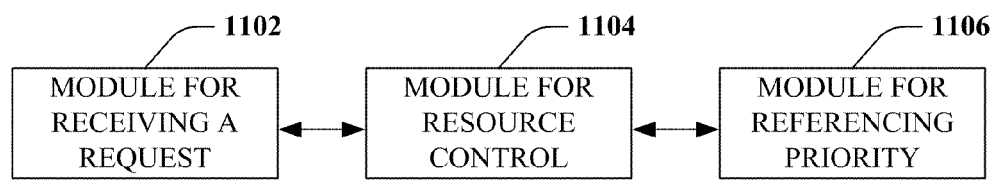

FIGS. 10 and 11 illustrate block diagrams of sample systems (1000 and 1100) for establishing access to mobile system resources based on application priority. System 1000 can include at least a module for associating application priority 1002 and a module to approve and/or deny access to a mobile system resource 1004. The module for associating priority 1002 can correlate a privilege code or a priority level, as described herein, with a mobile application of a mobile device. The priority level can establish a hierarchy relative to other mobile applications for determining access to a limited mobile system resource in the event of competition for such resource.

Module to approve/deny access 1004 can approve or deny access to a system resource for a requesting mobile application. For instance, if a request to control the mobile resource is received by the module 1004, such module 1004 can determine whether the request is to be fulfilled. Specifically, such request can be approved or denied based at least in part on the priority level or the privilege code associated with the mobile application by module 1002. Accordingly, if the mobile application requests access to a system resource and is a high priority application with respect to other applications, access can be given regardless of whether a lower priority application placed a first-in-time request, or is concurrently controlling the resource. As a result, services provided by higher priority applications can be executed more efficiently if facilitated by system 1000.

System 1100 can include at least a module for receiving a request to control a system resource 1102, a module for establishing system resource control 1104, and a module for referencing application priority 1106. More particularly, the module 1102 can receive a request to establish access to a dedicated network resource for a mobile application, as described herein. Module 1104 can establish control of the dedicated network resource for the mobile application, based on a determination made by module 1106, for instance. Further, module 1106 can reference a priority level or privilege code of the mobile application if establishing control of the resource requires transfer of the resource from a second mobile application. If module 1106 determines the priority level of the mobile application is higher than that of the second mobile application, module 1104 can establish control of the resource for the mobile application, and revoke control of the resource for the second mobile application. In this manner, high priority applications need not wait for a lower priority application to finish use of a system resource. Instead, the high priority application can be accorded access to the resource upon priority determination by module 1106, facilitating a more efficient and desirable mechanism to arbitrate control of limited mobile resources as compared with conventional mechanisms.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications, and variations that fall within the scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of providing resource allocation for mobile device applications performed on a mobile device, comprising:

associating and storing on the mobile device a first privilege code and a first set of priority levels associated with a first set of mobile device resources accessed by a first mobile application of the mobile device;

associating and storing on the mobile device a second privilege code and a second set of priority levels associated with a second set of mobile device resources accessed by a second mobile application of the mobile device;

associating and storing a resource priority level for each mobile device resource on the mobile device;

receiving a request from the first mobile application executing on a processor of the mobile device to access the first set of mobile device resources when the second mobile application attempts to concurrently control at least one common mobile device resource;

determining a particular mobile device resource among the first set of mobile device resources that has a highest resource priority level as a determinative mobile device resource;

retrieving a first priority level for the determinative mobile device resource in the first set of mobile device resources;
retrieving a second priority level for the determinative mobile device resource in the second set of mobile device resources;
comparing the first priority level for the determinative mobile device resource to the second priority level for the determinative mobile device resource; and
allowing access to the first set of mobile device resources by the first mobile application based at least in part on whether the first priority level for the determinative mobile device resource is higher than the second priority level for the determinative mobile device resource.

2. The method of claim 1, further comprising allowing access to a mobile device system resource if the resource is not utilized by another application or if a competing request associated with a higher priority level for the determinative mobile device resource is not concurrently received.

3. The method of claim 1, further comprising enabling customization of the first and second privilege codes or sets of priority levels associated with the first mobile application and second mobile application, respectively.

4. The method of claim 3, further comprising:
defining a service provider level of access and a consumer level of access that each enable distinct degrees of customization of the first and second privilege codes or sets of priority levels;
receiving a request to customize the first or second privilege codes or sets of priority levels that specify a service provider or consumer level of access; and
enabling customization of the first or second privilege codes or sets of priority levels to an extent defined by a degree of customization that matches the specified level of access.

5. The method of claim 1, further comprising conditioning allowance of access to the first set of mobile device system resources by the first mobile application at least in part upon verification of the first privilege code.

6. The method of claim 1, further comprising providing a default set of priority levels or privilege codes for a set of predetermined mobile applications comprising the first and second mobile applications.

7. The method of claim 6, further comprising enabling customization of the priority levels or privilege codes of the default set.

8. The method of claim 1, further comprising revoking access to the first set of mobile device resource for the first mobile application if a competing mobile application having higher priority level of the determinative mobile device system resource requests access to a common mobile device resource while the first mobile application is controlling the common mobile device resource.

9. The method of claim 8, further comprising:
allowing access to the first set of mobile device resources for the first mobile application once the competing mobile application terminates access to the common mobile device resource; or
periodically requesting access to the first set of mobile device resources for the first mobile application after access to the common mobile device resource is revoked.

10. The method of claim 1, further comprising modifying the first privilege code, second privilege code, or the first privilege code and the second privilege code, based on a concurrent state of an operating environment (OE) of the mobile device.

11. The method of claim 1, further comprising employing an audio decoder or a packet data protocol (PDP) context as one of the mobile device resources of the first set of mobile device resources.

12. An apparatus that manages resource allocation for mobile communication device applications, comprising:
a policy database configured to associate and store:
a first privilege code with a first mobile application of the mobile communication device;
a first set of priority levels with a first set of mobile device or network resources accessed by the first mobile application of the mobile communication device;
a second privilege code with a second mobile application of the mobile communication device;
a second set of priority levels with a second set of mobile device or network resources accessed by the second mobile application of the mobile communication device; and
a resource priority level with each mobile device or network resource; and a policy management module configured to:
receive a request from the first mobile application executing on a processor of the mobile communication device to access the first set of mobile device or network resources when the second mobile application attempts to concurrently control at least one common mobile device or network resource;
determine a particular mobile device or network resource among the first set of mobile device or network resources that has a highest resource priority level as a determinative mobile device or network resource;
retrieve a first priority level for the determinative mobile device or network resource in the first set of mobile device or network resources;
retrieve a second priority level for the determinative mobile device or network resource in the second set of mobile device or network resources;
compare the first priority level for the determinative mobile device or network resource to the second priority level for the determinative mobile device or network resource; and
approve access to the first set of mobile device or network resources for the first mobile application based at least in part on whether the first priority level for the determinative mobile device or network resource is higher than the second priority level for the determinative mobile device or network resource.

13. The apparatus of claim 12, further comprising a configuration module configured to provide customization of privilege code or priority level information for the first and/or second mobile applications.

14. The apparatus of claim 12, further comprising a custom configuration database configured to store a predetermined privilege code or priority level relationship for a set of predetermined mobile applications comprising the first and second mobile applications.

15. The apparatus of claim 12, further comprising an authentication module configured to verify the privilege code of the first mobile application, wherein the policy management module conditions access to the first set of mobile device or network resources at least in part based upon proper verification of the first privilege code.

16. The apparatus of claim 13, further comprising:
an access module configured to define at least a network provider level of access and a consumer level of access for customization of information within the policy database;
an assignment module configured to accord a network provider or consumer level of access to a user; and
an input module configured to receive information pertaining to user level of access.

17. The apparatus of claim 16, wherein the access module provides a different degree of customization for consumer level access and network provider level access.

18. The apparatus of claim 12, further comprising an application scheduler configured to re-initiate at a later time a request to access the first set of mobile device or network resources for the first mobile application if access to the first set of mobile device or network resources is denied for the first mobile application.

19. The apparatus of claim 13, wherein:
the first mobile application initiates a request for the first set of mobile device or network resources that includes an application ID and the first privilege code;
the policy management component utilizes the application ID to identify the first set of priority levels within the policy database; and
the configuration module is further configured to dynamically update the first set of priority levels of the first mobile application based on a concurrent state of a mobile OE of the mobile communication device.

20. The apparatus of claim 12, further comprising an access termination module configured to remove access to the first set of mobile device or network resources if the policy management component receives a request for a common mobile device or network resource from the second mobile application having a second priority level for the determinative mobile device or network resource higher than the first priority level for the determinative mobile device or network resource.

21. At least one processor in a mobile device configured to manage allocation of a plurality of system resources for mobile device applications, comprising:
a first module configured for associating and storing:
a first privilege code with a first mobile application of the mobile device;
a first set of priority levels with a first set of system resources accessed by the first mobile application of the mobile device;
a second privilege code with a second mobile application of the mobile device;
a second set of priority levels with a second set of system resources accessed by the second mobile application of the mobile communication device; and
a resource priority level with each system resource; and
a second module configured to:
receive a request from the first mobile application executing on the at least one processor to access the first set of system resources when the second mobile application attempts to concurrently control at least one common system resource;
determine a particular system resource among the first set of system resources that has a highest resource priority level as a determinative system resource;
retrieve a first priority level for the determinative system resource in the first set of mobile device resources;
retrieve a second priority level for the determinative mobile device or network resource in the second set of mobile device or network resources;
compare the first priority level for the determinative mobile device or network resource to the second priority level for the determinative mobile device or network resource; and
approve access to the first set of system resources for the first mobile application, the approval based at least in part on whether the first priority level for the determinative mobile device or network resource is higher than the second priority level for the determinative mobile device or network resource.

22. An apparatus that manages allocation of a plurality of system resources for mobile device applications, comprising:
means for associating and storing on a mobile device a first privilege code with a first mobile application of the mobile device;
means for associating and storing on a mobile device a first set of priority levels with a first set of system resources accessed by the first mobile application of the mobile device;
means for associating and storing on a mobile device a second privilege code with a second mobile application of the mobile device;
means for associating and storing on a mobile device a second set of priority levels with a second set of system resources accessed by the second mobile application of the mobile communication device;
means for associating and storing on a mobile device a resource priority level with each system resource;
means for receiving a request from the first mobile application executing on the at least one processor to access the first set of system resources when the second mobile application attempts to concurrently control at least one common system resource;
means for determining a particular system resource among the first set of system resources that has a highest resource priority level as a determinative system resource;
means for retrieving a first priority level for the determinative system resource in the first set of mobile device resources;
means for retrieving a second priority level for the determinative mobile device or network resource in the second set of mobile device or network resources;
means for comparing the first priority level for the determinative mobile device or network resource to the second priority level for the determinative mobile device or network resource; and
means for approving access to the first set of system resources for the first mobile application, the approval based at least in part on whether the first priority level for the determinative mobile device or network resource is higher than the second priority level for the determinative mobile device or network resource.

23. A non-transitory computer-readable medium having stored thereon processor-executable instructions for managing allocation of system resources for mobile device applications, the instructions being configured to cause a processor of a mobile device to perform operations comprising:
associating and storing a first privilege code with a first mobile application of the mobile device;
associating and storing on the mobile device a first set of priority levels associated with a first set of system resources accessed by the first mobile application of the mobile device;

associating and storing on the mobile device a second privilege code with a second mobile application of the mobile device;

associating and storing on the mobile device a second set of priority levels with a second set of system resources accessed by the second mobile application of the mobile communication device;

associating and storing on the mobile device a resource priority level with each system resource;

receiving a request from the first mobile application executing on the at least one processor to access the first set of system resources when the second mobile application attempts to concurrently control at least one common system resource;

determining a particular system resource among the first set of system resources that has a highest resource priority level as a determinative system resource;

retrieving a first priority level for the determinative system resource in the first set of mobile device resources;

retrieving a second priority level for the determinative mobile device or network resource in the second set of mobile device or network resources;

comparing the first priority level for the determinative mobile device or network resource to the second priority level for the determinative mobile device or network resource; and approving access to the first set of system resources for the first mobile application, approval based at least in part on whether the first priority level for the determinative mobile device or network resource is higher than the second priority level for the determinative mobile device or network resource.

\* \* \* \* \*